United States Patent
Mahood et al.

(10) Patent No.: US 9,567,445 B2
(45) Date of Patent: *Feb. 14, 2017

(54) POLYCARBONATE FILMS FOR CAPACITORS, METHODS OF MANUFACTURE, AND ARTICLES MANUFACTURED THEREFROM

(71) Applicant: SABIC GLOBAL TECHNOLOGIES B.V., Bergen Op Zoom (NL)

(72) Inventors: James Alan Mahood, Evansville, IN (US); Matthew Frank Niemeyer, North Chatham, NY (US); Anne E. Bolvari, West Chester, PA (US); Mark A. Sanner, Evansville, IN (US); Neal Pfeiffenberger, Conshohocken, PA (US)

(73) Assignee: SABIC GLOBAL TECHNOLOGIES B.V. (NL)

(*) Notice: Subject to any disclaimer, the term of this patent is extended or adjusted under 35 U.S.C. 154(b) by 0 days.

This patent is subject to a terminal disclaimer.

(21) Appl. No.: 14/431,070

(22) PCT Filed: Aug. 28, 2014

(86) PCT No.: PCT/US2014/053182
§ 371 (c)(1),
(2) Date: Mar. 25, 2015

(87) PCT Pub. No.: WO2015/031627
PCT Pub. Date: Mar. 5, 2015

(65) Prior Publication Data
US 2016/0060403 A1    Mar. 3, 2016

Related U.S. Application Data

(60) Provisional application No. 61/871,031, filed on Aug. 28, 2013.

(51) Int. Cl.
*C08J 5/18* (2006.01)
*C08L 69/00* (2006.01)
(Continued)

(52) U.S. Cl.
CPC .............. *C08J 5/18* (2013.01); *B29C 47/0004* (2013.01); *B29C 47/0021* (2013.01);
(Continued)

(58) Field of Classification Search
CPC .. B29C 47/0004; B29C 47/0021; B29C 71/04; C08G 64/12; C08J 3/24; C08J 5/18; C08J 7/123; C08J 2369/00; C08J 2469/00; C08J 2479/08; C08L 69/00; H01G 2/22; B29K 2069/00; B29K 2995/0007; B29L 2031/3412
See application file for complete search history.

(56) References Cited

U.S. PATENT DOCUMENTS 3,484,664 A    12/1969   Liddicoat
4,895,760 A    1/1990    Barger
(Continued)

FOREIGN PATENT DOCUMENTS

EP    0984030 A2    3/2000
EP    2108673 A1    10/2009
(Continued)

OTHER PUBLICATIONS

Sci Finder Search Results.*
(Continued)

*Primary Examiner* — Maria Veronica Ewald
*Assistant Examiner* — Travis Figg
(74) *Attorney, Agent, or Firm* — Cantor Colburn LLP

(57) ABSTRACT

A film comprises a phthalimidine copolycarbonate comprising first repeating units and second repeating units different
(Continued)

from the first repeating units, wherein the first repeating units are phthalimidine carbonate units

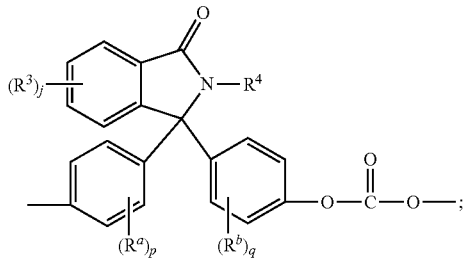

and
the second repeating units comprise bisphenol carbonate units that are not the same as the first repeating phthalimidine carbonate units; and a second polycarbonate that is not a phthalimidine copolycarbonate; wherein the film has: a glass transmission temperature of greater than 170° C.; a dielectric constant at 1 kHz, 23° C. and 50% relative humidity of at least 3.0; a dissipation factor at 1 kHz, 23° C. and 50% relative humidity of 1% or less; and a breakdown strength of at least 800 Volt/micrometer.

19 Claims, 1 Drawing Sheet

(51) Int. Cl.

| | |
|---|---|
| C08G 64/12 | (2006.01) |
| B29C 47/00 | (2006.01) |
| B29C 71/04 | (2006.01) |
| C08J 3/24 | (2006.01) |
| C08J 7/12 | (2006.01) |
| H01G 2/22 | (2006.01) |
| B29K 69/00 | (2006.01) |
| B29L 31/34 | (2006.01) |

(52) U.S. Cl.
CPC .............. *B29C 71/04* (2013.01); *C08G 64/12* (2013.01); *C08J 3/24* (2013.01); *C08J 7/123* (2013.01); *C08L 69/00* (2013.01); *H01G 2/22* (2013.01); *B29K 2069/00* (2013.01); *B29K 2995/0007* (2013.01); *B29L 2031/3412* (2013.01); *C08J 2369/00* (2013.01); *C08J 2469/00* (2013.01); *C08J 2479/08* (2013.01)

(56) References Cited

U.S. PATENT DOCUMENTS

| 5,260,407 A | 11/1993 | Saruwatari et al. |
|---|---|---|
| 5,357,033 A | 10/1994 | Bendler et al. |
| 5,636,100 A | 6/1997 | Zheng et al. |
| 6,420,011 B1 | 7/2002 | Tsunekawa et al. |
| 6,426,861 B1 | 7/2002 | Munshi |
| 6,511,701 B1 | 1/2003 | Divigalpitiya et al. |
| 6,559,270 B1 | 5/2003 | Siclovan et al. |
| 6,586,791 B1 | 7/2003 | Lee et al. |
| 6,974,620 B1 | 12/2005 | Tsunekawa et al. |
| 7,079,372 B2 | 7/2006 | Weber et al. |
| 8,218,291 B2 | 7/2012 | Silvi et al. |
| 8,779,040 B2* | 7/2014 | van der Weele ..... C08K 5/5399 524/116 |
| 9,328,240 B2* | 5/2016 | van der Mee ........ C08L 69/005 |
| 2003/0171494 A1 | 9/2003 | Aramaki et al. |
| 2006/0194070 A1 | 8/2006 | Croll et al. |
| 2007/0108490 A1 | 5/2007 | Tan et al. |
| 2007/0116976 A1 | 5/2007 | Tan et al. |
| 2007/0117886 A1 | 5/2007 | Tan et al. |
| 2007/0148467 A1 | 6/2007 | St. Lawrence et al. |
| 2007/0169886 A1 | 7/2007 | Watanabe et al. |
| 2007/0258190 A1 | 11/2007 | Irwin et al. |
| 2008/0004404 A1 | 1/2008 | Van De Grampel et al. |
| 2008/0044639 A1 | 2/2008 | Chan et al. |
| 2008/0119631 A1 | 5/2008 | Mullen |
| 2008/0123250 A1 | 5/2008 | Tan et al. |
| 2009/0045544 A1 | 2/2009 | Silvi et al. |
| 2009/0088504 A1* | 4/2009 | Chatterjee ............... C08L 69/00 524/158 |
| 2009/0154057 A1 | 6/2009 | Tan |
| 2009/0226711 A1 | 9/2009 | Silvi et al. |
| 2009/0245547 A1 | 10/2009 | Lee et al. |
| 2009/0318604 A1* | 12/2009 | de Kraker ............... C08L 69/00 524/451 |
| 2010/0020468 A1 | 1/2010 | Tan et al. |
| 2010/0079926 A1 | 4/2010 | Tan et al. |
| 2010/0246094 A1 | 9/2010 | Tan et al. |
| 2010/0302707 A1 | 12/2010 | Tan et al. |
| 2011/0071261 A1* | 3/2011 | Hoeks .................... C08G 63/64 525/418 |
| 2011/0216474 A1 | 9/2011 | Grosrenaud et al. |
| 2011/0242729 A1 | 10/2011 | Silvi et al. |
| 2011/0299222 A1 | 12/2011 | Suzuki et al. |
| 2012/0081833 A1 | 4/2012 | Cao et al. |
| 2012/0287555 A1 | 11/2012 | Silvi et al. |
| 2014/0355173 A1 | 12/2014 | Odle et al. |

FOREIGN PATENT DOCUMENTS

| GB | 1458712 | 12/1976 |
|---|---|---|
| JP | S62272404 A | 11/1987 |
| JP | S63270760 A | 11/1988 |
| JP | H05169526 A | 7/1993 |
| JP | H0820060 A | 1/1996 |
| JP | 2001332443 A | 11/2001 |
| JP | 2005290378 A | 10/2005 |
| JP | 2008274023 A | 11/2008 |
| JP | 2009141293 A | 6/2009 |
| WO | 2012155083 A1 | 11/2012 |
| WO | 2012155116 A1 | 11/2012 |
| WO | 2014100341 A1 | 6/2014 |

OTHER PUBLICATIONS

Irwin et al.; "Development of High Temperature Capacitors for High Density, High Temperature Applications"; SAE International Journal of Aerospace, vol. 1, No. 1; Jan. 2009; pp. 817-821.
JP2008274023 A, Published Nov. 13, 2008, English Abstract only, 1 page.
JP2009141293 a; English Abstract; Date of Publication Jun. 25, 2009; 2 pages.
JP2010147329 Abstract; Published Jul. 1, 2010; 2 pages.
JP5169526 A; Abstract; Published Jul. 9, 1993; 2 pages.
JP8020060 A; Abstract; Published Jan. 23, 1996; 1 page.
International Search Report for International Application No. PCT/US2014/053182, Application Filing Date Aug. 28, 2014, Date of Mailing Dec. 23, 2014, 4 pages.
Written Opinion for International Application No. PCT/US2014/053182, Application Filing Date Aug. 28, 2014, Date of Mailing Dec. 23, 2014, 5 pages.

* cited by examiner

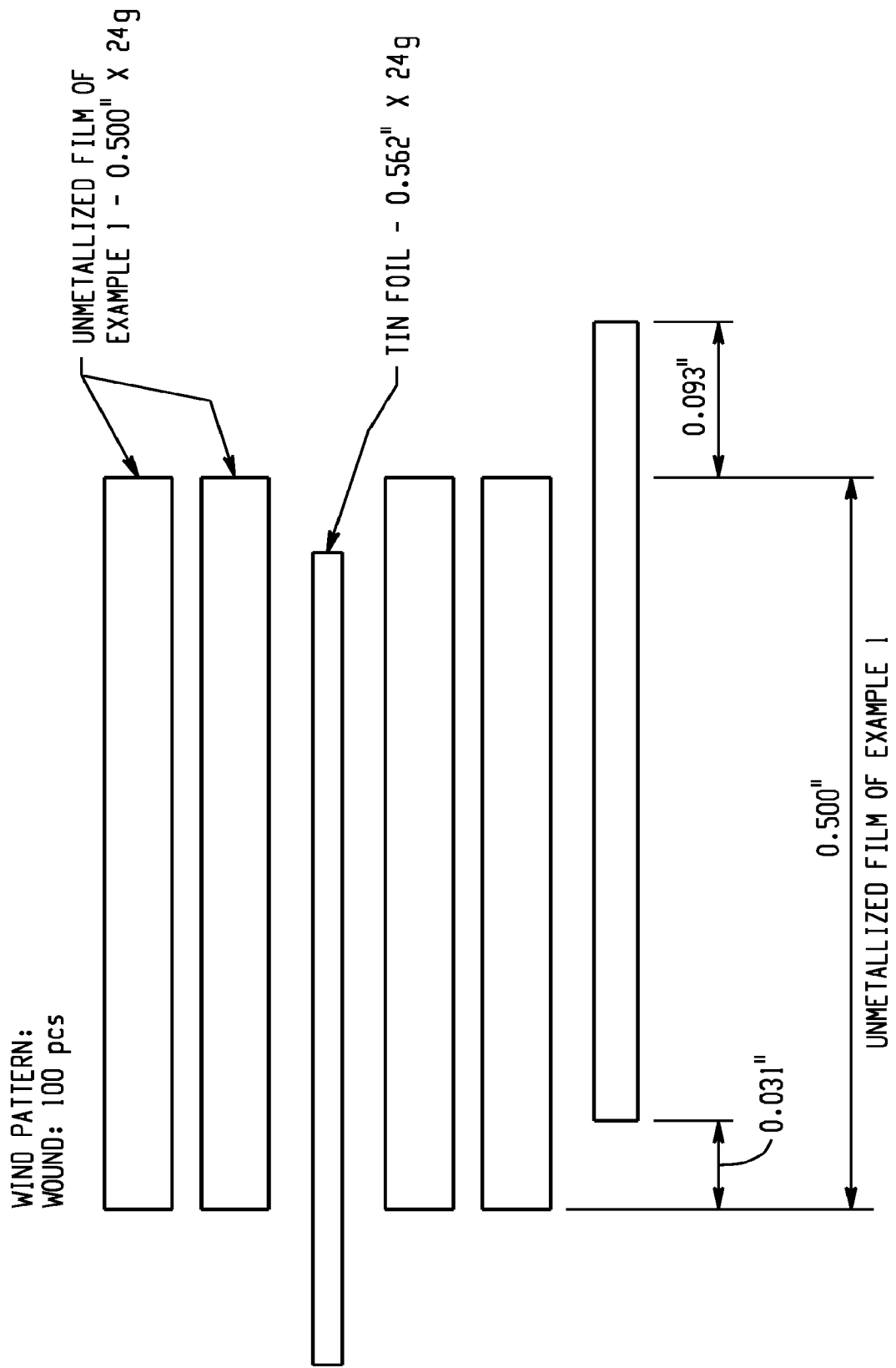

POLYCARBONATE FILMS FOR CAPACITORS, METHODS OF MANUFACTURE, AND ARTICLES MANUFACTURED THEREFROM

CROSS REFERENCE TO RELATED APPLICATIONS

This application is a National Stage application of PCT/US2014/053182, filed Aug. 28, 2014, which claims the benefit of U.S. Provisional Application No. 61/871,031, filed Aug. 28, 2013, both of which are incorporated by reference in their entirety herein.

BACKGROUND

This disclosure relates to polymer films, and in particular to polymer films useful for the manufacture of capacitors.

Electrostatic film capacitors with high volumetric energy density, high operating temperature, and long lifetime are critical components for pulse-power, automotive, and industrial electronics. Capacitors are essentially energy-storing devices having two parallel conductive plates separated by a thin layer of an insulating (dielectric) film. When a voltage is applied across the plates, the electric field in the dielectric displaces electric charges, and thus stores energy. The amount of energy stored by a capacitor depends on the dielectric constant and breakdown voltage of the insulating material, and the dimensions (total area and thickness) of the film, such that in order to maximize the total amount of energy that a capacitor can accumulate, the dielectric constant and breakdown voltage of the film are maximized, and the thickness of the film minimized. Because the physical characteristics of the dielectric material in the capacitor are the primary determining factors for the performance of a capacitor, improvements in one or more of the physical properties of the dielectric material in a capacitor can result in corresponding performance improvements in the capacitor component, usually resulting in performance and lifetime enhancements of the electronics system or product in which it is embedded.

Electrostatic film capacitors made from biaxially-oriented polypropylene (BOPP) have been used in applications requiring a low dissipation factor, high insulation resistance and low dielectric absorption, such as in electrical appliances, electronic equipment, oven and furnaces, refrigerators, automobiles, and home appliances. However, the low dielectric constant (DK), which is about 2.2, and the maximum service temperature of about 100° C., limit the use of these capacitors in applications requiring high operating temperatures and/or high energy densities.

There accordingly remains a need in the art for new films and methods for their manufacture that can produce films of excellent electrical properties, in particular high breakdown strength. It would be a further advantage if such films could operate at higher temperature than BOPP films.

SUMMARY

Disclosed herein is a film comprising a phthalimidine copolycarbonate comprising first repeating units and second repeating units different from the first repeating units, wherein the first repeating units are phthalimidine carbonate units

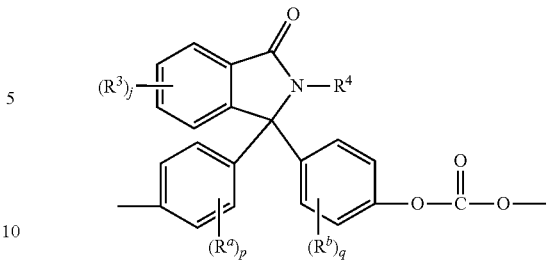

wherein $R^a$ and $R^b$ are each independently a $C_{1-12}$ alkyl, $C_{1-12}$ alkenyl, $C_{3-8}$ cycloalkyl, or $C_{1-12}$ alkoxy, p and q are each independently 0 to 4, each $R^3$ is independently a $C_{1-6}$ alkyl, j is 0 to 4, and $R^4$ is hydrogen, $C_{1-6}$ alkyl, or phenyl optionally substituted with 1 to 5 $C_{1-6}$ alkyl groups; and the second repeating units comprise bisphenol carbonate units that are not the same as the first repeating phthalimidine carbonate units; and a second polycarbonate that is not a phthalimidine copolycarbonate; wherein the film has: a glass transmission temperature of greater than 170° C.; a dielectric constant at 1 kHz, 23° C. and 50% relative humidity of at least 3.0; a dissipation factor at 1 kHz, 23° C. and 50% relative humidity of 1% or less; and a breakdown strength of at least 800 Volt/micrometer.

A method of producing the film comprises extruding a film forming composition comprising the phthalimidine copolycarbonate and the second polycarbonate.

An article comprising the above film is also disclosed.

In another embodiment, a capacitor comprises the article.

An electronic device comprising the capacitor is also disclosed.

The above described and other features are exemplified by the following drawings, detailed description, examples, and claims.

BRIEF DESCRIPTION OF THE DRAWINGS

A description of the FIGURE, which is meant to be exemplary and not limiting, is provided in which:

FIG. 1 illustrates a pattern by which a film is wound into a test foil capacitor.

DETAILED DESCRIPTION

The inventors hereof have discovered that films having excellent breakdown strength can unexpectedly be obtained from polycarbonate compositions comprising phthalimidine copolycarbonates such as N-phenylphenolphthaleinylbisphenol, 2,2-bis(4-hydro)-bisphenol A copolycarbonate ("PPPBP-BPA") and a second polycarbonate such as a BPA homopolymer. In an additionally advantageous feature, the films can have a high glass transition temperature, a high dielectric constant or a low dissipation factor across wide frequency and temperature ranges.

In particular, the films provide an increase in the dielectric breakdown strength compared to prior art films, while retaining other advantageous physical and electrical characteristics, such as good heat resistance, improved energy density, reduced energy losses, and desirable dielectric constant stability. For example, the films can have a voltage breakdown strength of at least 800 Volts/micrometer, a dielectric constant at 1 kHz, 23° C. and 50% relative humidity of greater than 3.0, a dissipation factor at 1 kHz, 23° C. and 50% relative humidity of less than 1%, and a glass transition temperature of greater than 150° C. The films and capacitors made from the films accordingly offer advantages over current materials, and the high energy and high temperature capacitors manufactured are useful in a variety of application such as automobile inverter applications.

The phthalimidine copolycarbonates used in the films have first and second repeating carbonate units, wherein the first carbonate units are phthalimidine carbonate units and the second carbonate units are not phthalimidine carbonate units. The first repeating units are phthalimidine carbonate units of formula (1)

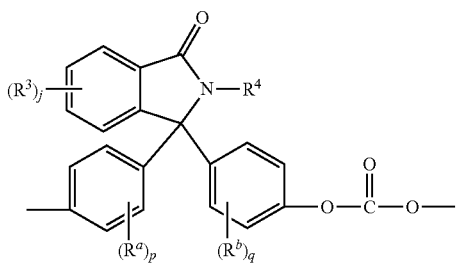

(1)

wherein $R^a$ and $R^b$ are each independently a $C_{1-12}$ alkyl, $C_{1-12}$ alkenyl, $C_{3-8}$ cycloalkyl, or $C_{1-12}$ alkoxy, specifically a $C_{1-3}$ alkyl, p and q are each independently 0 to 4, specifically 0 to 1, each $R^3$ is independently a $C_{1-6}$ alkyl, j is 0 to 4, and $R^4$ is hydrogen, $C_{1-6}$ alkyl or phenyl optionally substituted with 1 to 5 $C_{1-6}$ alkyl groups. In an embodiment, $R^a$ and $R^b$ are each independently $C_{1-3}$ alkyl. For example, the phthalimidine carbonate units can be of formula (1b)

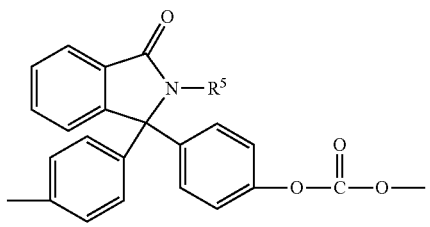

(1b)

wherein $R^5$ is hydrogen, phenyl optionally substituted with up to five $C_{1-6}$ alkyl groups, or $C_{1-4}$ alkyl. In an embodiment, $R^5$ is hydrogen, phenyl, or methyl. Carbonate units (1b) wherein $R^5$ is phenyl can be derived from 2-phenyl-3,3'-bis (4-hydroxy phenyl)phthalimidine (also known as N-phenyl phenolphthalein bisphenol, or "PPPBP," and also known as 3,3-bis(4-hydroxyphenyl)-2-phenylisoindolin-1-one).

The second repeating units are bisphenol carbonate units of formula (2)

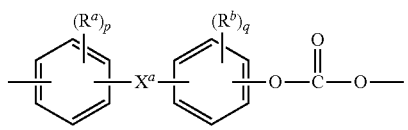

(2)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)—, —S(O)$_2$—, —C(O)—, or a $C_{1-32}$ bridging hydrocarbon group, provided that $X^a$ is not a phthalimidine group. In an embodiment, $X^a$ is a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group. Exemplary $X^a$ groups include methylene, ethylidene, neopentylidene, and isopropylidene. The bridging group $X^a$ and the carbonate oxygen atoms of each $C_6$ arylene group can be disposed ortho, meta, or para (specifically para) to each other on the $C_6$ arylene group.

In a specific embodiment, $R^a$ and $R^b$ are each independently a $C_{1-3}$ alkyl group, p and q are each independently 0 to 1, and $X^a$ is a single bond, —O—, —S(O)—, —S(O)$_2$—, —C(O)—, a $C_{1-9}$ alkylidene of formula —C($R^c$)($R^d$)— wherein $R^c$ and $R^d$ are each independently hydrogen or $C_{1-8}$ alkyl, or a group of the formula —C(=$R^e$)— wherein $R^e$ is a divalent $C_{1-9}$ hydrocarbon group. In another specific embodiment, $R^a$ and $R^b$ are each independently a methyl group, p and q are each independently 0 to 1, and $X^a$ is a single bond, a $C_{1-7}$ alkylidene of formula —C($R^c$)($R^d$)— wherein $R^c$ and $R^d$ are each independently hydrogen or $C_{1-6}$ alkyl. In an embodiment, p and q is each 1, and $R^a$ and $R^b$ are each a $C_{1-3}$ alkyl group, specifically methyl, disposed meta to the oxygen on each ring. The bisphenol carbonate units (2) can be derived from bisphenol A, where p and q are both 0 and $X^a$ is isopropylidene.

Some illustrative examples of other specific bisphenol compounds that can be used to produce second units (2) include 4,4'-dihydroxybiphenyl, bis(4-hydroxyphenyl) methane, 1,2-bis(4-hydroxyphenyl)ethane, 2-(4-hydroxyphenyl)-2-(3-hydroxyphenyl)propane, 1,2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, bis (4-hydroxyphenyl)ether, bis(4-hydroxyphenyl)sulfide, bis (4-hydroxyphenyl)sulfoxide, bis(4-hydroxyphenyl)sulfone, or a combination comprising at least one of the foregoing bisphenolic compounds. phthalimidine copolycarbonate The relative mole ratio of first phthalimidine carbonate units (1) and second bisphenol carbonate units (2) can vary from 99:1 to 1:99, depending on the desired characteristics of the copolycarbonate, including glass transition temperature ("Tg"), impact strength, ductility, flow, and like considerations. For example, the mole ratio of units (1):units (2) can be from 90:10 to 10:90, from 80:20 to 20:80, from 70:30 to 30:70, or from 60:40 to 40:60. In a specific embodiment, the phthalimide copolycarbonate is PPPBP-BPA, the mole ratio of units (1) to units (2) can be from 1:99 to 50:50, or from 10:90 to 45:55.

Other carbonate units can be present in any of the phthalimidine copolycarbonates described herein in relatively small amounts, for example less than 20 mole %, less than 10 mole %, or less than 5 mole %, based on the total moles of units in the phthalimidine copolycarbonate. In an embodiment, no other carbonate units are present. In still another embodiment, no other types of repeating units are present in the copolycarbonates, for example no ester units.

The phthalimidine copolycarbonate is used in combination with a second polycarbonate that is not a phthalimidine copolycarbonate. The second polycarbonate comprises units of formula (2). The second polycarbonate includes homopolycarbonates (wherein each carbonate units in the polymer is the same), copolymers comprising different carbonate units ("copolycarbonates"), and copolymers comprising carbonate units and other types of polymer units, such as ester units or siloxane units. In an embodiment, the second polycarbonate is a BPA homopolymer. The weight ratio of the phthalimidine copolycarbonate to the second polycarbonate can vary broadly, for example 40:60 to 90:10, specifically 50:50 to 85:15, more specifically 60:40 to 80:20, or 65:35 to 80:20, depending on the desired properties of the film.

The phthalimidine copolycarbonates and the second polycarbonates can be manufactured by processes such as interfacial polymerization and melt polymerization. Although the reaction conditions for interfacial polymerization can vary, an exemplary process generally involves dissolving or dispersing a dihydroxy compound in aqueous NaOH or KOH, adding the resulting mixture to a water-immiscible solvent, and contacting the reactants with a carbonate precursor in the presence of a catalyst such as, for example, a tertiary amine or a phase transfer catalyst, under controlled pH conditions, e.g., 8 to 10. The water-immiscible solvent can be, for example, methylene chloride, 1,2-dichloroethane, chlorobenzene, toluene, and the like. Exemplary carbonate precursors include a carbonyl halide such as carbonyl bromide or carbonyl chloride (phosgene) a bishaloformate of a dihydroxy compound (e.g., the bischloroformate of bisphenol A, hydroquinone ethylene glycol, neopentyl glycol, or the like), and diaryl carbonates. Combinations comprising at least one of the foregoing types of carbonate precursors can also be used. The diaryl carbonate ester can be diphenyl carbonate, or an activated diphenyl carbonate having electron-withdrawing substituents on the each aryl, such as bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing. Among tertiary amines that can be used as catalysts in interfacial polymerization are aliphatic tertiary amines such as triethylamine and tributylamine, cycloaliphatic tertiary amines such as N,N-diethyl-cyclohexylamine, and aromatic tertiary amines such as N,N-dimethylaniline. Among the phase transfer catalysts that can be used are catalysts of the formula $(R^3)_4Q^+X$, wherein each $R^3$ is the same or different, and is a $C_{1-10}$ alkyl; Q is a nitrogen or phosphorus atom; and X is a halogen atom or a $C_{1-8}$ alkoxy or $C_{6-18}$ aryloxy. Exemplary phase transfer catalysts include $(CH_3(CH_2)_3)_4NX$, $(CH_3(CH_2)_3)_4NX$, $(CH_3(CH_2)_5)_4NX$, $(CH_3(CH_2)_6)_4NX$, $(CH_3(CH_2)_4)_4NX$, $CH_3(CH_3(CH_2)_3)_3NX$, and $CH_3(CH_3(CH_2)_2)_3NX$, wherein X is Cl, Br, a $C_{1-8}$ alkoxy or a $C_{6-18}$ aryloxy. An effective amount of a phase transfer catalyst can be 0.1 to 10 wt. %, or 0.5 to 2 wt. %, each based on the weight of dihydroxy compound in the phosgenation mixture.

Alternatively, melt processes can be used to make the polycarbonates. Generally, in the melt polymerization process, polycarbonates can be prepared by co-reacting, in a molten state, a dihydroxy reactant and a diaryl carbonate ester in the presence of a transesterification catalyst. The reaction may be carried out in typical polymerization equipment, such as a continuously stirred reactor (CSTR), plug flow reactor, wire wetting fall polymerizers, free fall polymerizers, wiped film polymerizers, BANBURY mixers, single or twin screw extruders, or a combination of the foregoing. Volatile monohydric phenol is removed from the molten reactants by distillation and the polymer is isolated as a molten residue. Melt polymerization may be conducted as a batch process or as a continuous process. In either case, the melt polymerization conditions used may comprise two or more distinct reaction stages, for example, a first reaction stage in which the starting dihydroxy aromatic compound and diaryl carbonate are converted into an oligomeric polycarbonate and a second reaction stage wherein the oligomeric polycarbonate formed in the first reaction stage is converted to high molecular weight polycarbonate. Such "staged" polymerization reaction conditions are especially suitable for use in continuous polymerization systems wherein the starting monomers are oligomerized in a first reaction vessel and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has a number average molecular weight of about 1,000 to about 7,500 Daltons. In one or more subsequent polymerization stages, the number average molecular weight (Mn) of the polycarbonate is increased to between about 8,000 and about 25,000 Daltons (using polycarbonate standard). Typically, solvents are not used in the process, and the reactants dihydroxy aromatic compound and the diaryl carbonate are in a molten state. The reaction temperature can be about 100° C. to about 350° C., specifically about 180° C. to about 310° C. The pressure may be at atmospheric pressure, supra-atmospheric pressure, or a range of pressures from atmospheric pressure to about 15 torr in the initial stages of the reaction, and at a reduced pressure at later stages, for example about 0.2 to about 15 torr. The reaction time is generally about 0.1 hours to about 10 hours.

Catalysts used in the melt transesterification polymerization production of polycarbonates can include alpha or beta catalysts. Beta catalysts are typically volatile and degrade at elevated temperatures. Beta catalysts are therefore preferred for use at early low-temperature polymerization stages. Alpha catalysts are typically more thermally stable and less volatile than beta catalysts. The alpha catalyst can comprise a source of alkali or alkaline earth ions. The sources of these ions include alkali metal hydroxides such as lithium hydroxide, sodium hydroxide, and potassium hydroxide, as well as alkaline earth hydroxides such as magnesium hydroxide and calcium hydroxide. Other possible sources of alkali and alkaline earth metal ions include the corresponding salts of carboxylic acids (such as sodium acetate) and derivatives of ethylene diamine tetraacetic acid (EDTA) (such as EDTA tetrasodium salt, and EDTA magnesium disodium salt). Other alpha transesterification catalysts include alkali or alkaline earth metal salts of carbonate, such as $Cs_2CO_3$, $NaHCO_3$, and $Na_2CO_3$, and the like, non-volatile inorganic acid such as $NaH_2PO_3$, $NaH_2PO_4$, $Na_2HPO_3$, $KH_2PO_4$, $CsH_2PO_4$, $Cs_2HPO_4$, and the like, or mixed salts of phosphoric acid, such as $NaKHPO_4$, $CsNaHPO_4$, $CsKHPO_4$, and the like. Combinations comprising at least one of any of the foregoing catalysts can be used.

Possible beta catalysts can comprise a quaternary ammonium compound, a quaternary phosphonium compound, or a combination comprising at least one of the foregoing. The quaternary ammonium compound can be a compound of the structure $(R^4)_4N^+X^-$, wherein each $R^4$ is the same or different, and is a $C_{1-20}$ alkyl, a $C_{4-20}$ cycloalkyl, or a $C_{4-20}$ aryl; and $X^-$ is an organic or inorganic anion, for example a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often used. The quaternary phosphonium compound can be a compound of the structure $(R^5)_4P^+X^-$, wherein each $R^5$ is the same or different, and is a $C_{1-20}$ alkyl, a $C_{4-20}$ cycloalkyl, or a $C_{4-20}$ aryl; and $X^-$ is an organic or inorganic anion, for example a hydroxide, phenoxide, halide, carboxylate such as acetate or formate, sulfonate, sulfate, formate, carbonate, or bicarbonate. Where $X^-$ is a polyvalent anion such as carbonate or sulfate it is understood that the positive and negative charges in the quaternary ammonium and phosphonium structures are properly balanced. For example, where $R^{20}$ to $R^{23}$ are each methyls and $X^-$ is carbonate, it is understood that $X^-$ represents $2(CO_3^{-2})$. Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations comprising at least one of the foregoing. TBPA is often used. The amount of alpha and beta catalyst used can be based upon the total number of moles of dihydroxy compound used in the polymerization reaction. When referring to the ratio of beta catalyst, for example, a phosphonium salt, to all dihydroxy compounds used in the polymerization reaction, it is convenient to refer to moles of phosphonium salt per mole of the dihydroxy compound, meaning the number of moles of phosphonium salt divided by the sum of the moles of each individual dihydroxy compound present in the reaction mixture. The alpha catalyst can be used in an amount sufficient to provide $1\times10^{-2}$ to $1\times10^{-8}$ moles, specifically, $1\times10^{-4}$ to $1\times10^{-7}$ moles of metal per mole of the dihydroxy compounds used. The amount of beta catalyst (e.g., organic ammonium or phosphonium salts) can be $1\times10^{-2}$ to $1\times10^{-5}$, specifically $1\times10^{-3}$ to $1\times10^{-4}$ moles per total mole of the dihydroxy compounds in the reaction mixture. Quenching of the transesterification catalysts and any reactive catalysts residues with an acidic compound after polymerization is completed can also be useful in some melt polymerization processes. Removal of catalyst residues and/or quenching agent and other volatile residues from the melt polymerization reaction after polymerization is completed can also be useful in some melt polymerization processes.

An end-capping agent (also referred to as a chain stopper agent or chain terminating agent) can be included during polymerization to provide end groups. The end-capping agents (and thus end groups) are selected based on the desired properties of the polycarbonates. Exemplary end-capping agents are exemplified by monocyclic phenols such as phenol and $C_1$-$C_{22}$ alkyl-substituted phenols such as p-cumyl-phenol, resorcinol monobenzoate, and p- and tertiary-butyl phenol, monoethers of diphenols, such as p-methoxyphenol, and alkyl-substituted phenols with branched chain alkyl substituents having 8 to 9 carbon atoms, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, mono-carboxylic acid chlorides such as benzoyl chloride, $C_1$-$C_{22}$ alkyl-substituted benzoyl chloride, toluoyl chloride, bromobenzoyl chloride, cinnamoyl chloride, and 4-nadimidobenzoyl chloride, polycyclic, mono-carboxylic acid chlorides such as trimellitic anhydride chloride, and naphthoyl chloride, functionalized chlorides of aliphatic monocarboxylic acids, such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used.

The phthalimidine copolycarbonate and the second polycarbonate can further optionally be crosslinked. Methods for crosslinking are known, for example irradiating the extruded film at a wavelength and for a time effective to crosslink the phthalimidine copolycarbonate or the second polycarbonate. For example, crosslinking can be by ultraviolet irradiation at a wavelength greater than 280 nm and less than or equal to 400 nm.

In an embodiment, the crosslinked phthalimidine copolycarbonate or crosslinked second polycarbonate exhibits an increase in breakdown strength of 5 to 50% more than the same film comprising an uncrosslinked phthalimidine copolycarbonate or an uncrosslinked second polycarbonate. In an embodiment, the phthalimidine copolycarbonate and the second polycarbonate is not crosslinked.

Alternatively, or in addition, the film optionally comprises a branched phthalimidine copolycarbonate or a branched second polycarbonate, and wherein the film exhibits a breakdown strength that is from 5 to 50% more than a film that is the same except comprising an unbranched phthalimidine copolycarbonate or an unbranched second polycarbonate. When a branched phthalimidine copolycarbonate or a branched second polycarbonate is used, the film can exhibit a breakdown strength that is from 5 to 50% more than a film that is the same except comprising an unbranched phthalimidine copolycarbonate or unbranched polycarbonate. In an embodiment, the film does not contain a branched phthalimidine copolycarbonate or a branched second polycarbonate. In another embodiment, the film contains a branched second polycarbonate and an unbranched phthalimidine copolycarbonate.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of about 0.05 to about 2.0 wt. %. Combinations comprising linear polycarbonates and branched polycarbonates can be used.

The phthalimidine copolycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

Good electrical properties are obtained when the polycarbonate film-forming compositions and films contain low levels of certain metal ions. Thus, the film-forming compositions and films contain less than 50 ppm, specifically less than 40 ppm, 30 ppm, 20 ppm, or 10 ppm by weight of each of aluminum, calcium, chromium, magnesium, iron, nickel, potassium, manganese, molybdenum, sodium, titanium, and zinc. In an embodiment, the total amount of aluminum, calcium, chromium, magnesium, iron, nickel, potassium, manganese, molybdenum, sodium, titanium, and zinc in the film-forming compositions and films is less than 10 ppm.

In some embodiments, it is desired to use polycarbonate film-forming compositions and films that are essentially free of bromine and chlorine. "Essentially free" of bromine and chlorine means that the composition has less than 3 wt. % of bromine and chlorine and in other embodiments, less than 1 wt. % bromine, and chlorine by weight of the film-forming composition. In other embodiments, the composition is halogen free. "Halogen free" is defined as having a halogen content (total amount of fluorine, bromine, chlorine, iodine, and astatine) of less than or equal to 1500 parts by weight of total halogen per million parts by weight of the total composition (ppm) with an individual halogen content of less than or equal to 900 ppm. The amount of halogen can be determined by ordinary chemical analysis such as atomic absorption.

In an embodiment, the films comprise less than 0.1 ppm of leachable ionic chlorides and sulfates. The films can also comprise fewer than two, or no carbonized inclusions having a diameter greater than 20 micrometers in an area of 100 $cm^2$.

The polycarbonate film-forming compositions can include various additives incorporated into dielectric substrate polymer compositions with the proviso that the additives are selected so as to not significantly adversely affect the desired physical and electrical properties of the compositions. Exemplary additives include antioxidants, thermal stabilizers, light stabilizers, ultraviolet light (UV) absorbing additives, quenchers, plasticizers, lubricants, mold release agents, antistatic agents, flame retardants, anti-drip agents, and radiation stabilizers. Combinations of additives can be used. The foregoing additives (except any fillers) are generally present individually in an amount from 0.005 to 10 wt. %, specifically 0.01 to 2 wt. %, based on the total weight of the film-forming composition. In a specific embodiment, the amount of additives is minimized. For example, any additive having a molecular weight of less than 250 Daltons is present in an amount of 0 to 1,000 parts per million by weight, for example 50 to 1,000 ppm, based on the weight of the phthalimidine copolycarbonate.

Suitable antioxidants can be compounds such as phosphites, phosphonites and hindered phenols or mixtures thereof. Phosphorus-containing stabilizers including triaryl phosphites and aryl phosphonates are useful additives. Difunctional phosphorus containing compounds can also be unseeded. Preferred stabilizers can have a molecular weight greater than or equal to 300. Some exemplary compounds are tris-di-tert-butylphenyl phosphite available from Ciba Chemical Co. as IRGAPHOS 168 and bis(2,4-dicumylphenyl)pentaerythritol diphosphite available commercially from Dover Chemical Co. as DOVERPHOS S-9228.

Examples of phosphites and phosphonites include: triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)-pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butyl-phenyl) 4,4'-biphenylene diphosphonite, bis(2,4-di-tert-butyl-6-methylphenyl)methyl phosphite, bis(2,4-di-tert-butyl-6-methylphenyl)ethyl phosphite, 2,2',2"-nitrilo[triethyl tris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite and 5-butyl-5-ethyl-2-(2,4,6-tri-tert-butylphenoxy)-1,3,2-dioxaphosphirane.

Combinations comprising more than one organophosphorous compound are contemplated. When used in combination the organophosphorous compounds can be of the same type or different types. For example, a combination can comprise two phosphites or a combination can comprise a phosphite and a phosphonite. In some embodiments, phosphorus-containing stabilizers with a molecular weight greater than or equal to 300 are useful. Phosphorus-containing stabilizers, for example an aryl phosphite are usually present in the composition in an amount from 0.005 to 3 wt. %, specifically 0.01 to 1.0 wt. %, based on total weight of the composition.

Hindered phenols can also be used as antioxidants, for example alkylated monophenols, and alkylated bisphenols or poly phenols. Exemplary alkylated monophenols include 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4-isobutylphenol; 2,6-dicyclopentyl-4-methylphenol; 2-(alpha-methylcyclohexyl)-4,6-dimethylphenol; 2,6-dioctadecyl-4-methylphenol; 2,4,6-tricyclohexylphenol; 2,6-di-tert-butyl-4-methoxymethylphenol; nonyl phenols which are linear or branched in the side chains, for example, 2,6-di-nonyl-4-methylphenol; 2,4-dimethyl-6-(1'-methylundec-1'-yl)phenol; 2,4-dimethyl-6-(1'-methylheptadec-1'-yl)phenol; 2,4-dimethyl-6-(1'-methyltridec-1'-yl)phenol and mixtures thereof. Exemplary alkylidene bisphenols include 2,2'-methylenebis(6-tert-butyl-4-methylphenol), 2,2'-methylenebis(6-tert-butyl-4-ethylphenol), 2,2'-methylenebis[4-methyl-6-(alpha-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(alpha-methylbenzyl)-4-nonylphenol], 2,2'-methylenebis[6-(alpha, alpha-dimethylbenzyl)-4-nonylphenol], 4,4'-methylenebis-(2,6-di-tert-butylphenol), 4,4'-methylenebis (6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)pentane and mixtures thereof.

The hindered phenol compound can have a molecular weight of greater than or equal to 300 g/mole. The high molecular weight can help retain the hindered phenol moiety in the polymer melt at high processing temperatures, for example greater than or equal to 300° C. Hindered phenol stabilizers, are usually present in the composition in an amount from 0.005 to 2 wt. %, specifically 0.01 to 1.0 wt. %, based on total weight of the composition.

There is considerable overlap among plasticizers, lubricants, and mold release agents, which include, for example, glycerol tristearate (GTS), phthalic acid esters (e.g., octyl-4,5-epoxy-hexahydrophthalate), tris-(octoxycarbonylethyl) isocyanurate, tristearin, di- or polyfunctional aromatic phosphates (e.g., resorcinol tetraphenyl diphosphate (RDP), the bis(diphenyl)phosphate of hydroquinone and the bis(diphenyl)phosphate of bisphenol A); poly-alpha-olefins; epoxidized soybean oil; silicones, including silicone oils (e.g., poly(dimethyl diphenyl siloxanes); esters, for example, fatty acid esters (e.g., alkyl stearyl esters, such as, methyl stearate, stearyl stearate, and the like), waxes (e.g., beeswax, montan wax, paraffin wax, or the like), or combinations comprising at least one of the foregoing plasticizers, lubricants, and mold release agents. These are generally used in amounts of 0.01 to 5 wt. %, based on the total weight of the polymer in the composition.

In some embodiments, the polycarbonate film-forming compositions can further optionally include at least one additional amorphous polymer, again with the proviso that the polymers are selected so as to not provide more than 5 wt. % of fluorine or silicon, or otherwise not significantly adversely affect the desired properties of the compositions. Examples of such additional polymers include and are not limited to poly(phenylene sulfone)s, poly(sulfone)s, poly(ether sulfone)s, poly(arylene sulfone), poly(phenylene ether)s, poly(etherimide)s, and poly(etherimide sulfone)s as well as blends and co-polymers thereof. Examples of other additional polymers include and are not limited to silicone polyetherimides, polyesters, silicone polycarbonate-polyester copolymers and a combination comprising at least one of the foregoing. When present, the polymer is used in an amount from more than 0 to 50 wt. %, 1 to 50 wt. %, 0 to 12 wt. %, 0.1 to 10 wt. %, or from 0.5 to 5 wt. %, all based on the total weight of the composition. In an embodiment, no polymer other than the phthalimidine copolycarbonate and the second polycarbonate is present in the film-forming composition.

The polycarbonate film-forming compositions can be prepared by blending the ingredients under conditions for the formation of an intimate blend. Such conditions often include melt mixing in single or twin screw type extruders, mixing bowl, or similar mixing devices that can apply a shear to the components. Twin-screw extruders are often preferred due to their more intensive mixing capability and self-wiping capability, over single screw extruders. It is often advantageous to apply a vacuum to the blend through at least one vent port in the extruder to remove volatile impurities in the composition. Often it is advantageous to dry the phthalimidine copolycarbonate (and/or other additives) prior to melting. The melt processing is often done at 240° C. to 360° C. to avoid excessive polymer degradation while still allowing sufficient melting to get an intimate polymer mixture free of any unmelted components. The polymer blend can also be melt filtered using a 40 to 100 micrometer candle or screen filter to remove undesirable black specks or other heterogeneous contaminants, for example any particles having a diameter of greater than 1 micrometer.

The composition can be extruded using extruders conventionally used for thermoplastic compositions using a flat die. The extrusion cast film method involves the melting of the polymer in an extruder, conveying of the molten polymer through a flat die of small lip gap separation, the stretching of the film at relatively high take-up speeds, and the cooling/solidification of the polymer to form the final film. The extruder may be of the single- or twin-screw design, and a melt pump may also be used to provide a constant, non-pulsating flow of polymer through the die. The die lip gap may be as small as 100 to 200 micron, and the take-up rollers may operate at speeds of up to 200 m/min. The design may also include the addition of a heated roll to temper/anneal the film and thus minimize the occurrence of frozen-in internal stresses. The edges of the film are often trimmed, and the film wound up on a roll using a tension-controlled winding mechanism. In some instances, commercial and/or experimentally functionalized fillers can be uniformly dispersed in the polymer prior to stretching the composite material into a thin film. In these cases, the compounding of the filler into the polymeric matrix to obtain a uniform dispersion can be done on a separate extruder or alternatively, and more preferably, on the same extruder used to effect the melting of the polymer prior to the stretching operation. The accuracy of delivering a constant and uniform flow of molten polymer through the die, the rheological properties of the polymer used to make the film, the cleanliness of both polymer and equipment, and the mechanical characteristics of the take-up mechanism will all contribute to the successful preparation of these extruded films having relatively small thicknesses.

In an embodiment, the extrusion cast film method is one-step, scalable to larger size equipment, and does not require the use of any solvent. Even for the case of polymers of high molecular weight and/or high glass transition temperature; this extrusion process can be properly designed to provide an environment for the polymer that does not lead to excessive temperatures that can cause the thermal or mechanical degradation of the material. The use of a filtration device for the melt produces a film that is virtually free of contaminants, such as gels and black specks, which would damage the dielectric performance of these films if not properly removed from the melt. The films produced by this method are thin (10 micron in thickness, and even thinner), of uniform thickness across the web, flat with almost no wrinkles or surface waviness, and relatively free of contamination.

The melted composition can be conveyed through the extruder die using a melt pump. In an embodiment, the film is extruded at temperatures from 250° C. to 500° C., for example 300° C. to 450° C., and the extruded film is uniaxially stretched to produce the dielectric substrate film. Specifically, the components of the film-forming composition are combined, melted, and intimately mixed, then filtered to remove particles greater than 1 micrometer; extruded through a flat die at the foregoing temperatures; and then uniaxially stretched. After stretching, the film can be directly metallized as described below, or wound on a take-up roll for storage or shipping. The film can have a length of at least 10, or 100 to 10,000 meter, and a width of at least 300, or 300 to 3,000 millimeter. The rate at which the film can be extruded can vary. In commercial embodiments, the rate at which the film can be extruded varies from 10 lb/hr (4.5 kg/hr) to 1000 lb/hr (450 kg/hr). The rate at which the film can be pulled from the die plate of the extruder (the take-up speed) can range from 10 meter/minute to 300 meter/minute.

The films can be metallized on at least one side thereof. A variety of metals and metal alloys can be used depending on the intended use of the film, for example copper, aluminum, silver, gold, nickel, zinc, titanium, chromium, vanadium, platinum, tantalum, niobium, brass, or a combination comprising at least one of the foregoing. The films are metallized at least on the smooth side, that is, the side having an average surface roughness Ra of less than +/−3% of the average film thickness as determined by optical profilometry. Methods for the metallization of polymer films are known, and include, for example, vacuum metal vapor deposition, metal sputtering, plasma treatments, electron beam treatments, chemical oxidation or reduction reactions, as well as electroless wet-chemical deposition. The films can be metallized on both sides by conventional electroless plating. In another embodiment, a patterned metal layer can be formed on a surface of the film, for example by ink jet printing. The thickness of the metallized layer is determined by the intended use of the metallized film, and can be, for example, 1 Angstrom to 1000 nanometers, 500 nanometer, or 10 nanometer. In an embodiment, the thickness of the metal film can be 1 to 3000 Angstrom, 1 to 2000 Angstrom, or 1 to 1000 Angstrom. If a conductive metal is used, the resistivity of the metal layer on the polymer film can vary from 0.1 to 1000 Ohm per square or 0.1 to 100 Ohm per square measured according to ASTMD257. The unmetallized film can also have a surface resistivity greater than 0.1 Ohm per square to 100 Ohm per square measured according to ASTMD257.

The surface of the film to be metallized can be pre-treated, for example by washing, flame treatment, plasma discharge corona discharge, or the like, for example to enhance adhesion of the metal layer. One or more additional layers can be deposited on the metal layer, for example a clear coat (such as a poly(methyl methacrylate) or poly(ethyl methacrylate) to provide scratch resistance), or another layer of the phthalimidine copolycarbonate film to form a laminate.

The films and metallized films thus produced have a variety of advantageous physical properties. In an embodiment, the breakdown strength of the un-metallized film is at least 700 Volt/micrometer, at least 750 Volt/micrometer, or at least 750 Volt/micrometer. In an embodiment, the breakdown strength of the unmetallized film can be up to 800 or 820 Volt/micrometer. In an embodiment, the breakdown strength difference of the films from 23° C. to 100° C. is less than 10% from the value measured at 23° C. measured according to ASTM D149.

The composition and manufacturing method can be varied to achieve the desired performance properties, in particular electrical properties.

The films can have a high dielectric constant, in particular greater than 2.5 up to 4.0, for example greater than 2.8, greater than 2.9, greater than 3.0, greater than 3.1, or greater than 3.2, up to 7.0, at 1 kHz, 23° C. and 50% relative humidity.

The films can have a glass transition temperature (Tg) of greater than 150° C., greater than 160° C., greater than 170° C., or greater than 180° C., up to 250° C. as measured using differential scanning calorimetry.

The films further can have a dielectric constant that is stable up to the Tg of the polymer that they are made from. Generally, the films are used in environment at a temperature that is lower than the film polymer's respective Tg, e.g. approximately 20° C. lower. In one embodiment, the films further can have a dielectric constant that undergoes less than 10% change up to 140° C., up to 150° C., up to 160° C., or up to 170° C. In an embodiment, the dielectric constant change of the film from −40° C. to 150° C. at 1 kHz is less than 10% of the room temperature (23° C.) dielectric constant value.

The difference in capacitance of the films at 1 kHz can be less than +/−5% from 0° C. to 100° C. based on the value at 23° C.

The films can have at least one region that is wrinkle-free, that is, sufficiently flat and smooth so that when a surface thereof is metallized, the metallized film has an advantageously consistent surface morphology.

The flatness of the wrinkle-free regions of the films can be determined by measuring the variation in thickness of the film over a specific area. Here, flat films have variation of the thickness of the film of plus or minus (+/−) 10% or less, alternatively +/−9% or less, +/−8% or less, +/−6% or less, or +/−5%, +/−4%, +/−3%, +/−2%, +/−1% or less, based on the average thickness of the film over the measured area. In an embodiment, the variation in thickness can be as low as +/−1%.

The smoothness of the wrinkle-free regions of a surface of the films can be quantitated by measuring the surface roughness average ("Ra") of the surface by optical profilometry. Here, the wrinkle-free regions of the films have a surface having a Ra of less than +/−3%, less than/−2%, or a low as +/−1% of the average thickness of the film as measured by optical profilometry.

In a particularly advantageous feature, the wrinkle-free regions can be produced over a large area of the film. For example, at least 80%, at least 85%, at least 90%, at least 95%, or at least 97% of area of the film can be wrinkle-free. As such, the films can have wrinkle-free regions having a lower limit and/or an upper limit. The range can include or exclude the lower limit and/or the upper limit. The lower limit and/or upper limit can be selected from 80, 81, 82, 83, 84, 85, 86, 87, 88, 89, 90, 91, 92, 93, 94, 95, 96, 97, 98, 99, and 100% of the area of the film. In another embodiment, the wrinkle-free region can have a contiguous area of at least 1 square meter ($m^2$), at least 2 $m^2$, at least 3 $m^2$, at least 5 $m^2$, at least 10 $m^2$, at least 20 $m^2$, at least 50 $m^2$, or at least 100 $m^2$. The large size of the wrinkle-free regions offers a significant manufacturing advantage, in that the metallized films can be manufactured, stored, and shipped in roll form. Thus, the film can have a length of at least 10 meter, and a width of at least 300 millimeter, wherein at least 80%, at least 85%, at least 90%, at least 95%, or at least 97% of area of the film is the wrinkle-free region. In another embodiment, the film has a length of 100 to 10,000 meter, and a width of 300 to 3,000 millimeter, wherein at least 80%, at least 85%, at least 90%, at least 95%, or at least 97% of area of the film is the wrinkle-free region. As such, when the films have a length ranging from 100 to 10,000 meters, the films can have wrinkle-free regions having a lower limit and/or an upper limit. The range can include or exclude the lower limit and/or the upper limit. The lower limit and/or upper limit can be selected from 80, 81, 82, 83, 84, 85, 86, 87, 88, 89, 90, 91, 92, 93, 94, 95, 96, 97, 98, 99, and 100% of the area of the film.

The films and the metallized films can be essentially solvent-free, that is, contain less than 1,000 ppm, less than 750 ppm, less than 500 ppm, or less than 250 ppm of a compound having a molecular weight of less than 250 Daltons.

The films and the metallized films can have less than 50 ppm, less than 25 ppm, or less than 10 ppm each of aluminum, calcium, chromium, magnesium, iron, nickel, potassium, manganese, molybdenum, sodium, titanium, and zinc in the polycarbonate layer.

The films and the metallized films can have less than 1000 ppm, less than 500 ppm, less than 250 ppm, or less than 100 ppm each of a fluorine-containing compound or a silicone-containing compound.

The films and the metallized films can have no observable specks or gels over an area of at least 0.3 square meters, or over an area of at least 0.9 square meters when viewed at a distance of 0.3 meter without magnification. The films and the metallized films can have no observable voids over an area of at least 0.3 square meters, or over an area of at least 0.9 square meters when viewed at a magnification of 50×.

The metallized films can have a dissipation factor, as measured by dielectric spectroscopy, ranging from more than 0 and less than 5%, alternatively more than 0 and less than 4%, alternatively more than 0 and less than 3%, alternatively more than 0 and less than 2%, alternatively more than 0 and less than 1%, at 1 kHz, 23° C. and 50% relative humidity. In one embodiment, the films have a low dissipation factor, that is, less than 0.1%, or less than 0.08%, at 1 kHz, 23° C. and 50% relative humidity. In an embodiment, the dissipation factor is less than 1% from 1 kHz to 100 kHz at 23° C. and 50% relative humidity.

The phthalimidine copolycarbonate films can be used in any amorphous film application, but are particularly suitable for metallization. The metallized films can be used in any metallized film application, but are particularly suitable for electrical applications, for example as capacitors or circuit materials. High energy density, high voltage non-polar capacitors can be made using a metalized polymer film that is wound into a cylindrical shape. In a specific embodiment, the phthalimidine copolycarbonate film is extruded, then metallized by spraying a conductive metal such as copper or aluminum onto the moving polymer film via vapor deposition in a vacuum chamber, to a thickness from 1 Angstrom to 1000 nanometers, 1 to 3000 Angstrom, or 1 to 1000 Angstrom. The resistivity of the metal on the polymer film can be in a range from about 0.1 Ohm per square to 100 Ohm per square as determined according to ASTMD257. Before the metallization process is performed, the polymer film can be appropriately masked to provide unmetallized margins at the edges of the width of the film, so that alternate layers of metallized film (when the capacitor is assembled) have unmetallized regions at opposite edges to prevent electrical shorting of the electrodes of the capacitor when the end metallization is ultimately applied.

The capacitors can then be fabricated by rolling two stacked metalized polymer films into a tubular shape. Electrical wires are connected to each metal layer. In a specific embodiment, two separate rolls of the metallized film are placed in a capacitor winder and wound tightly together on a mandrel (which may subsequently be removed) so that the layers are arranged in the sequence phthalimidine copolycarbonate/metallized layer/phthalimidine copolycarbonate/metallized layer, to replicate a typical construction of a capacitor, i.e., a dielectric with two metallic layers on opposite sides. The two rolls of film are wound with the unmetallized margins on opposite sides.

The extent of winding of the capacitor depends on the physical size of the capacitor desired or on the capacitance desired. Tight winding of the two rolls aids in removing any entrapped air that might otherwise cause premature breakdown. Individual capacitors can be processed in a clean room environment of at least class 100, incorporating HEPA filters, to reduce the likelihood of contamination of the contact point between the dielectric film layers by foreign particles, as well as reducing moisture intake in the dielectric. Electric winding can be used to better maintain uniform tension on each capacitor. The capacitor can then be taped at the edges thereof and strapped in a tray open on both sides, to prevent unwinding of the film layers and to allow the edges or ends of the cylinder to be sprayed with a conductive element, for example with a high zinc content solder followed by a regular softer end spray solder of 90% tin, 10% zinc. The first spray scratches the metallized surface and creates a trough to achieve better contact with the metallization on the dielectric film. The combination of end sprays further aids better contact adhesion with the final termination. Subsequently, conductive, e.g., aluminum leads can then be soldered onto each end to form the final termination. One termination can be spot welded to the bottom of the can, while the other termination can be parallel welded to the lid. The capacitor may be filled with a liquid impregnate (for example, isopropyl phenyl sulfone), in vacuum filling apparatus, and closed.

Other capacitor configurations are possible. For example, the capacitor can have a flat configuration comprising at least a first and a second electrode disposed in a stacked configuration; and the phthalimidine copolycarbonate film disposed between and in at least partial contact with each of the first and second electrodes. Additional phthalimidine copolycarbonate films and electrode layers can be present in alternating layers. Thus, a multilayer article for forming an electronic device is within the scope of the present claims, comprising a phthalimidine copolycarbonate layer/metal layer/dielectric layer, wherein the dielectric layer can be a phthalimidine copolycarbonate film as describe herein, or other dielectric material. Additional layers (e.g., additional alternating dielectric/metal layers) can optionally be present.

Set forth below are some embodiments of the film, the article comprising the film, the capacitor, and the electronic device comprising the capacitor.

In an embodiment, the film comprises: a phthalimidine copolycarbonate comprising first repeating units and second repeating units different from the first repeating units, wherein the first repeating units are phthalimidine carbonate units

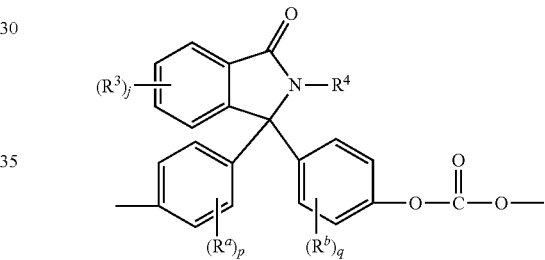

wherein $R^a$ and $R^b$ are each independently a $C_{1-12}$ alkyl, $C_{1-12}$ alkenyl, $C_{3-8}$ cycloalkyl, or $C_{1-12}$ alkoxy, p and q are each independently 0 to 4, each $R^3$ is independently a $C_{1-6}$ alkyl, j is 0 to 4, and $R^4$ is hydrogen, $C_{1-6}$ alkyl, or phenyl optionally substituted with 1 to 5 $C_{1-6}$ alkyl groups; and the second repeating units comprise bisphenol carbonate units that are not the same as the first repeating phthalimidine carbonate units; and a second polycarbonate that is not a phthalimidine copolycarbonate; wherein the film has: a glass transmission temperature of greater than 170° C.; a dielectric constant at 1 kHz, 23° C. and 50% relative humidity of at least 3.0; a dissipation factor at 1 kHz, 23° C. and 50% relative humidity of 1% or less; and a breakdown strength of at least 800 Volt/micrometer.

In specific embodiments of the foregoing film, one or more of the following conditions apply: the film has a thickness of more than 0 to less than 10 micrometers; the film has a length of at least 10 meters and a width of at least 300 millimeter and at least 80% of the area of the film is a wrinkle-free region; the film has a length of 100 to 10,000 meter, and a width of 300 to 3,000 millimeter; the film has a surface resistivity greater than 0.1 Ohm per square to 100 Ohm per square measured according to ASTMD257; the dielectric constant change of the film from −40° C. to 140° C. at 1 kHz is less than 10% of the dielectric constant value at 23° C.; a change of the dissipation factor at 1 kHz from 0° C. to 140° C. is less than 1%; the dissipation factor is less than 1% from 1 kHz to 100 kHz at 23° C. and 50% relative humidity; the breakdown strength difference of the film from 23° C. to 100° C. is less than 10% from the value measured at 23° C. measured according to ASTM D149; the difference in capacitance at 1 kHz is less than +/−5% from 0° C. to 100° C. based on the value at 23° C.; the phthalimidine carbonate units are units of the formula

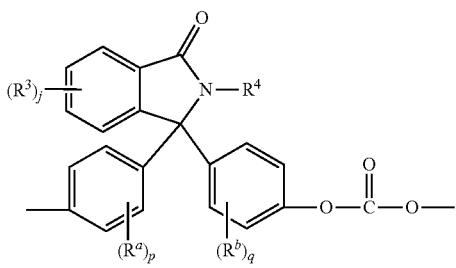

wherein $R^a$ and $R^b$ are each independently a $C_{1-3}$ alkyl group, p and q are each independently integers of 0 to 4, $R^3$ is each independently a $C_{1-6}$ alkyl group, j is 0 to 4, and $R^4$ is hydrogen, $C_{1-6}$ alkyl or phenyl optionally substituted with 1 to 5 $C_{1-6}$ alkyl groups; the phthalimidine carbonate units are carbonate units of the formula

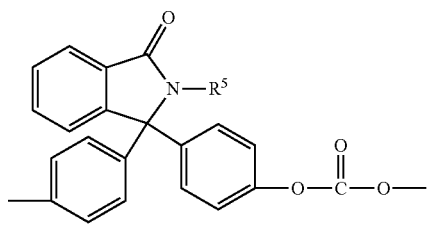

wherein $R^5$ is hydrogen, $C_{1-6}$ alkyl, or phenyl optionally substituted with 1 to 5 $C_{1-6}$ alkyl groups, for example, $R^5$ is phenyl or methyl; the second repeating units are carbonate units of the formula

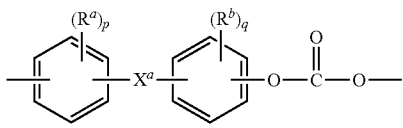

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently integers of 0 to 4, and $X^a$ is a single bond, —O—, —S—, —S(O)—, —S(O)$_2$—, —C(O)—, or $C_{1-32}$ bridging hydrocarbon group, provided that $X^a$ is not a phthalimidine group; the phthalimidine copolycarbonate is an N-phenylphenolphthaleinylbisphenol, 2,2-bis(4-hydro)-bisphenol A copolycarbonate; the film comprises a crosslinked phthalimidine copolycarbonate wherein the film exhibits a breakdown strength from 5 to 50% more compared to a film comprising of an uncrosslinked phthalimidine copolycarbonate; the film comprises a branched phthalimidine copolycarbonate wherein the film exhibits a breakdown strength from 5 to 50% more compared to a film comprising of an unbranched phthalimidine copolycarbonate; the second polycarbonate is a BPA homopolymer; the film comprises less than 1,500 ppm total of halogen containing compounds and less than 900 ppm of any halogen containing compounds; the film comprises less than 0.1 ppm of leachable low ionic chlorides and sulfates; the film comprises less than 10 ppm each of Al, Ca, Cr, Fe, K, Mg, Na, Ni, Mn, Mo, Zn, and Ti; the total amount of Al, Ca, Cr, Fe, K, Mg, Na, Ni, Mn, Mo, Zn, and Ti in the film is less than 10 ppm; the film further comprises a mold release agent; the film further comprises 1 to 50 weight percent of a polymer selected from silicone polyetherimide, polyetherimide sulfone, polyester, polycarbonate other than the phthalimidine copolycarbonate and the second polycarbonate, silicone polycarbonate-polyester copolymer and a combination comprising at least one of the foregoing, based on the total weight of the film; the film comprises fewer than two carbonized inclusions having a diameter greater than 20 micrometers in an area of 100 cm$^2$; the film is extruded; the film comprises less than 1,000 ppm of a compound having a molecular weight of less than 250 Dalton.

In another embodiment, an article comprises the film.

In specific embodiments of the article, at least one of the following conditions apply: the article further comprising a layer of a conductive metal or metal alloy deposited on at least a portion of the film; the conductive metal or metal alloy comprises aluminum, zinc, copper, silver, gold, nickel, titanium, chromium, vanadium, platinum, tantalum, niobium, brass, or a combination comprising at least one of the foregoing; the conductive metal layer has a thickness of 1 to 3,000 Angstroms; the conductive metal layer has a thickness of 1 to 2,000 Angstroms; the conductive metal layer has a resistivity of 0.1 to 100 Ohm/sq; the conductive metal layer is deposited by chemical vapor deposition, high temperature vacuum operations, or combinations thereof.

In yet another embodiment, a capacitor comprises a wound article or a portion of a wound article. In still another embodiment, an electronic device comprises the capacitor. The electric article is optionally an automobile inverter. In still another embodiment, a method of producing a film comprises extruding a film forming composition comprising the phthalimidine copolycarbonate and the second polycarbonate. The method optionally further comprises irradiating the extruded film at a wavelength and for a time effective to crosslink the polycarbonate, wherein the film comprising the crosslinked polycarbonate exhibits an increase in breakdown strength of 5 to 50% more than the same film comprising an uncrosslinked polycarbonate.

The following Examples are illustrative, and non-limiting.

EXAMPLES

The materials used in the Examples are described in Table 1.

| Component | Chemical Description | Source |
|---|---|---|
| PC1 | PPPBP-BPA copolycarbonate (N-phenylphenolphthaleinylbisphenol, 2,2-bis(4-hydro)-Bisphenol A copolycarbonate) produced via interfacial polymerization, 32 mol % PPPBP, para-cumylphenol (PCP) end-capped | SABIC |

-continued

| Component | Chemical Description | Source |
|---|---|---|
| PC2 | Bisphenol A Polycarbonate, produced via interfacial polymerization | SABIC |
| PC-Ester1 | Poly(phthalate-carbonate) copolymer, produced via interfacial polymerization, about 81 mol % ester units, para-cumylphenol (PCP) end-capped | SABIC |
| PC-Ester2 | Poly(phthalate-carbonate) copolymer, produced via interfacial polymerization, about 60 mol % ester units, para-cumylphenol (PCP) end-capped | SABIC |
| PEI | Polyetherimide, made via reaction of bisphenol A dianhydride with m-phenylene diamine | SABIC |
| IRGAPHOS 168 | Tris (2,4-di-tert-butylphenyl)phosphite | CIBA |

Testing Procedures

Film thickness was measured using a mechanical thickness gauge with 0.2 μm resolution.

Dissipation Factor (DF) was determined using an LCR meter. Polymer films with very uniform film thickness are used as the test samples. The film thickness d is precisely determined by micrometers or optical thickness gauges (if the film is transparent). Gold or aluminum electrodes 100-200 nm in thickness d, with known area A are deposited on both sides of the film sample using sputtering or thermal evaporation. The metallized sample is then loaded into a temperature-controlled chamber and electrically connected with a LCR meter, such as the Wayne Kerr 6044 cap option. The LCR meter measures the capacitance C, dielectric constant (DK), and the dissipation factor DF.

Dielectric Constant (DK) was determined using an LCR meter. Polymer films with very uniform film thickness are used as the test samples. The film thickness d is precisely determined by micrometers or optical thickness gauges (if the film is transparent). Gold or aluminum electrodes 100-200 nm in thickness d, with known area A are deposited on both sides of the film sample using sputtering or thermal evaporation. The metallized sample is then loaded into a temperature-controlled chamber and electrically connected with an LCR meter, such as the QuadTech 7600 Plus Precision LCR Meter. The DK of the sample is calculated based on the measured capacitance and the area and thickness of the sample:

$$DK = \frac{Cd}{A\varepsilon_0},$$

where $\varepsilon_0 = 8.85 \times 10^{-12}$ F/m, the vacuum permittivity constant.

Dielectric breakdown was determined in accordance with ASTM D-149. A piece of polymer film with uniform thickness is used as the test sample and the thickness is measured using a Heidenhain Certo CT2501 gauge with digital readout. The total error of the CT 6001 over the entire measuring range of 60 mm lies within ±0.05 μm at ambient temperatures between 19 and 21° C. The film sample is tested as a bare film without electrodes deposited on its surface. The film sample is placed between two metal electrodes, where the bottom electrode is a flat copper plate and the top electrode is a stainless steel ball with ¼ inch diameter. During the breakdown measurement, a continuously increasing DC voltage is applied on the sample between the two electrodes, starting from 0 V, and increasing with a fixed rate of 500 V/sec. The DC voltage is applied using a high voltage power supply, such as the Trek 30/20A-L controlled by Labview. The voltage increases until dielectric breakdown occurs, which generates large current and causes the power supply to automatically reset through its protection circuits. The highest reached voltage is recorded as the breakdown voltage $V_{BD}$, and the breakdown electric field $E_{BD}$ is determined by dividing $V_{BD}$ by the film thickness d. This method was employed unless another method is identified.

Glass transition temperature was determined using differential scanning calorimetry (DSC).

Avalanche was determined by a film foil sample with a Glassman 10 mA power supply. The test begins at zero volts and is ramped until a breakdown occurs. The voltage then plateaus until the breakdown stops. If the breakdown does not stop within 5 seconds, this voltage is determined as the avalanche voltage. If the break down stops within 5 seconds, the voltage is increased until the next break down occurs. The process repeats until the break downs "run-away" and do not stop within the 5 second plateau at which the avalanche voltage is recorded.

Capacitance (CAP) was determined by using an LCR meter. Polymer films with very uniform film thickness are used as the test samples. The film thickness d is precisely determined by micrometers or optical thickness gauges (if the film is transparent). Gold or aluminum electrodes 100-200 nm in thickness d, with known area A are deposited on both sides of the film sample using sputtering or thermal evaporation. The metallized sample is then loaded into a temperature-controlled chamber and electrically connected with an LCR meter, such as the QuadTech 7600 Plus Precision LCR Meter.

Equivalent series resistance (ESR) was determined by using an LCR meter. Polymer films with very uniform film thickness are used as the test samples. The film thickness d is precisely determined by micrometers or optical thickness gauges (if the film is transparent). Gold or aluminum electrodes 100-200 nm in thickness d, with known area A are deposited on both sides of the film sample using sputtering or thermal evaporation. The metallized sample is then loaded into a temperature-controlled chamber and electrically connected with an LCR meter, such as the QuadTech 7600 Plus Precision LCR Meter.

High potential (Hipot) was determined by placing the sample at an overvoltage of 400 V using a Glassman 10 mA power supply. The test is held at 400 V for 5 seconds after reaching 400 V and if no breakdowns occur, the sample is said to Pass (P).

Polymer blends were extruded on a single screw extruder with the following formulations.

| Component | Formulation 1 | Formulation 2 | Formulation 3 | Formulation 4 | Formulation 5 |
|---|---|---|---|---|---|
| PC1 | 70 | | | | |
| PC2 | 30 | 100 | | | |
| PC-Ester 1 | | | 100 | | |
| PC-Ester 2 | | | | 100 | |
| PEI | | | | | 100 |
| IRGAPHOS 168* | .06 | .06 | .06 | .06 | |

*Part by weight per 100 parts by weight of the polymers in the composition

Example 1

Formulation 1 was extruded to form films having a thickness of 6 micrometers. DSC was run on films 1-3 and the results are shown in Table 2.

TABLE 2

| Sample | 1 | 2 | 3 |
|---|---|---|---|
| $T_g$ (° C.) | 190.2 | 180.8 | 183.2 |

Films 4 and 5 were exposed to a temperature as shown in Table 3 for one hour and checked for shrinkage. The shrinkage results at the machine direction ("MD") and transverse direction ("TD") are shown in Table 3.

TABLE 3

| | Shrinkage | | | | | |
|---|---|---|---|---|---|---|
| Sample | MD (150° C.) | TD (150° C.) | MD (160° C.) | TD (160° C.) | MD (175° C.) | TD (175° C.) |
| 4 | 0% | 0% | 0% | 0% | 1% | 0% |
| 5 | 0% | 0% | 0% | 0% | % | 0% |

No shrinkage was observed up to 160° C., which demonstrates the films' high temperature heat resistance.

Avalanche testing results are summarized in Table 4. The results show good electrical strength and performance (<25% change in value) even to 150° C. At higher temperatures, the avalanche values decrease more significantly.

TABLE 4

| Sample | Avalanche at 25° C. (VDC) | Avalanche at 85° C. (VDC) | Avalanche at 105° C. (VDC) | Avalanche at 125° C. (VDC) | Avalanche at 150° C. (VDC) | Avalanche at 175° C. (VDC) |
|---|---|---|---|---|---|---|
| 6 | 698 | 668 | 689 | 645 | 670 | 372 |
| 7 | 688 | 684 | 589 | 672 | 608 | 367 |
| 8 | 710 | 665 | 597 | 570 | 427 | 391 |
| 9 | 767 | 674 | 584 | 562 | 654 | 360 |
| 10 | 693 | 713 | 688 | 622 | 464 | 596 |
| 11 | 691 | 673 | 582 | 663 | 398 | 396 |
| 12 | 762 | 653 | 627 | 682 | 639 | 553 |
| 13 | 699 | 632 | 672 | 654 | 663 | 450 |
| 14 | 682 | 704 | 691 | 583 | 438 | 650 |
| 15 | 753 | 650 | 628 | 643 | 458 | 523 |
| AVG | 714 | 672 | 635 | 630 | 542 | 466 |
| STDEV | 73 | 24 | 46 | 43 | 113 | 107 |
| V/μm | 60 | 56 | 53 | 52 | 45 | 39 |

Avg: average;
Stdev: standard derivation.

Example 2

This example compares the breakdown strength of the films extruded from formulation 1 and the breakdown strength of the films extruded from poly(ester-carbonate)s and PEI. Results are shown in Table 6.

TABLE 6

| Film Material | Film Thickness (μm) | Characteristic Breakdown Field (V/μm) | Beta |
|---|---|---|---|
| Formulation 1 | 10 | 949 | 11.6 |
| Formulation 1 | 6 | 906 | 8.2 |
| Formulation 1 | 10 | 920 | 10.6 |
| Formulation 1 | 16 | 891 | 15.9 |
| Formulation 1 | 20 | 864 | 9.7 |
| Formulation 1 | 10 | 923 | 6 |
| Formulation 2 | 10 | 852 | 17 |
| Formulation 3 | 10 | 790 | 4 |
| Formulation 3 | 20 | 759 | 5.5 |
| Formulation 4 | 16 | 733 | 8.7 |
| Formulation 4 | 10 | 752 | 9.4 |
| Formulation 5 | 5 | 551 | 13.2 |
| Formulation 5 | 13 | 580 | 21.2 |

The data in Table 6 indicates that the films made from the blends of PPPBP-BPA copolymer has a higher breakdown strength than films made from poly(ester-carbonate)s and PEI, and provides results that are comparable or even superior to the films made from BPA homopolymer, which have been widely used as a high heat capacitor material with use temperatures up to, for example, 125° C.

Example 3

Films of example 1 were wound into test foil capacitors using the pattern as shown in FIG. 1. Test results on 66 capacitors are given in Table 7. All tested capacitors passed the testing. DF was <1% at 1 kHz.

TABLE 7

| No. | CAP at 1 kHz | DF at 1 kHz | DF At 10 kHz | ESR at 50 kHz | Hipot at 400 Vdc |
|---|---|---|---|---|---|
| 1 | 0.020 | 0.095 | 0.204 | 588.23 | P |
| 2 | 0.020 | 0.094 | 0.201 | 576.60 | P |
| 3 | 0.020 | 0.092 | 0.195 | 551.65 | P |
| 4 | 0.020 | 0.096 | 0.202 | 585.47 | P |
| 5 | 0.020 | 0.092 | 0.194 | 571.22 | P |
| 6 | 0.020 | 0.093 | 0.198 | 562.96 | P |
| 7 | 0.020 | 0.094 | 0.195 | 566.98 | P |
| 8 | 0.020 | 0.092 | 0.195 | 561.15 | P |
| 9 | 0.019 | 0.088 | 0.187 | 568.91 | P |
| 10 | 0.019 | 0.089 | 0.189 | 576.70 | P |
| 11 | 0.021 | 0.096 | 0.201 | 554.78 | P |
| 12 | 0.021 | 0.091 | 0.194 | 558.02 | P |
| 13 | 0.019 | 0.091 | 0.190 | 572.24 | P |
| 14 | 0.020 | 0.090 | 0.188 | 550.95 | P |
| 15 | 0.019 | 0.091 | 0.192 | 582.77 | P |
| 16 | 0.020 | 0.089 | 0.185 | 545.38 | P |

TABLE 7-continued

| No. | CAP at 1 kHz | DF at 1 kHz | DF At 10 kHz | ESR at 50 kHz | Hipot at 400 Vdc |
|---|---|---|---|---|---|
| 17 | 0.019 | 0.090 | 0.187 | 585.49 | P |
| 18 | 0.019 | 0.088 | 0.183 | 558.21 | P |
| 19 | 0.020 | 0.090 | 0.188 | 549.85 | P |
| 20 | 0.020 | 0.091 | 0.193 | 555.68 | P |
| 21 | 0.020 | 0.092 | 0.195 | 562.89 | P |
| 22 | 0.019 | 0.087 | 0.186 | 572.25 | P |
| 23 | 0.020 | 0.088 | 0.188 | 547.83 | P |
| 24 | 0.020 | 0.088 | 0.189 | 540.15 | P |
| 25 | 0.019 | 0.087 | 0.185 | 566.68 | P |
| 26 | 0.020 | 0.090 | 0.189 | 552.64 | P |
| 27 | 0.019 | 0.090 | 0.191 | 579.11 | P |
| 28 | 0.020 | 0.093 | 0.198 | 567.98 | P |
| 29 | 0.021 | 0.090 | 0.191 | 542.60 | P |
| 30 | 0.020 | 0.091 | 0.194 | 563.73 | P |
| 31 | 0.020 | 0.089 | 0.187 | 557.74 | P |
| 32 | 0.020 | 0.090 | 0.193 | 567.53 | P |
| 33 | 0.020 | 0.089 | 0.188 | 546.33 | P |
| 34 | 0.020 | 0.091 | 0.188 | 556.30 | P |
| 35 | 0.021 | 0.094 | 0.197 | 548.71 | P |
| 36 | 0.021 | 0.093 | 0.195 | 554.75 | P |
| 37 | 0.021 | 0.094 | 0.195 | 550.77 | P |
| 38 | 0.019 | 0.089 | 0.189 | 572.70 | P |
| 39 | 0.021 | 0.093 | 0.195 | 547.19 | P |
| 40 | 0.019 | 0.089 | 0.189 | 565.92 | P |
| 41 | 0.019 | 0.089 | 0.187 | 566.57 | P |
| 42 | 0.019 | 0.087 | 0.183 | 565.01 | P |
| 43 | 0.019 | 0.092 | 0.195 | 579.80 | P |
| 44 | 0.019 | 0.089 | 0.189 | 565.39 | P |
| 45 | 0.020 | 0.093 | 0.194 | 565.19 | P |
| 46 | 0.020 | 0.092 | 0.192 | 546.91 | P |
| 47 | 0.021 | 0.089 | 0.187 | 534.25 | P |
| 48 | 0.020 | 0.092 | 0.195 | 567.32 | P |
| 49 | 0.020 | 0.091 | 0.191 | 552.20 | P |
| 50 | 0.020 | 0.090 | 0.189 | 539.67 | P |
| 51 | 0.019 | 0.087 | 0.185 | 558.13 | P |
| 52 | 0.020 | 0.090 | 0.192 | 553.85 | P |
| 53 | 0.019 | 0.088 | 0.188 | 566.38 | P |
| 54 | 0.020 | 0.093 | 0.193 | 572.48 | P |
| 55 | 0.020 | 0.091 | 0.192 | 567.59 | P |
| 56 | 0.019 | 0.096 | 0.188 | 573.40 | P |
| 57 | 0.019 | 0.090 | 0.193 | 572.78 | P |
| 58 | 0.020 | 0.088 | 0.189 | 566.48 | P |
| 59 | 0.020 | 0.093 | 0.196 | 578.86 | P |
| 60 | 0.019 | 0.091 | 0.196 | 586.33 | P |
| 61 | 0.019 | 0.091 | 0.200 | 591.32 | P |
| 62 | 0.020 | 0.093 | 0.196 | 571.89 | P |
| 63 | 0.021 | 0.095 | 0.202 | 574.77 | P |
| 64 | 0.020 | 0.095 | 0.200 | 594.12 | P |
| 65 | 0.019 | 0.093 | 0.196 | 596.13 | P |
| 66 | 0.019 | 0.089 | 0.187 | 562.22 | P |
| AVG: | 0.020 | 0.091 | 0.192 | 564.49 | |
| STDEV: | 0.001 | 0.002 | 0.005 | 13.93 | |

AVG: average;
STDEV: standard derivation

The singular forms "a," "an," and "the" include plural referents unless the context clearly dictates otherwise. "Or" means "and/or." The endpoints of all ranges directed to the same component or property are inclusive and independently combinable. The suffix "(s)" as used herein is intended to include both the singular and the plural of the term that it modifies, thereby including at least one of that term (e.g., "colorant(s)" includes at least one colorant). "Optional" or "optionally" means that the subsequently described event or circumstance may or may not occur, and that the description includes instances where the event occurs and instances where it does not. Unless defined otherwise, technical and scientific terms used herein have the same meaning as is commonly understood by one of skill in the art to which this invention belongs.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refer broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A film comprising a phthalimidine copolycarbonate comprising first repeating units and second repeating units different from the first repeating units, wherein the first repeating units are phthalimidine carbonate units

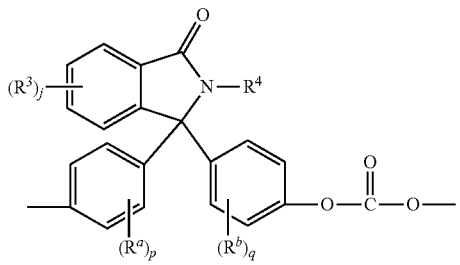

wherein
$R^a$ and $R^b$ are each independently a $C_{1-12}$ alkyl, $C_{1-12}$ alkenyl, $C_{3-8}$ cycloalkyl, or $C_{1-12}$ alkoxy,
p and q are each independently 0 to 4,
each $R^3$ is independently a $C_{1-6}$ alkyl,
j is 0 to 4, and
$R^4$ is hydrogen, $C_{1-6}$ alkyl, or phenyl optionally substituted with 1 to 5 $C_{1-6}$ alkyl groups;
and
the second repeating units comprise bisphenol carbonate units that are not the same as the first repeating phthalimidine carbonate units;
the second repeating units having the formula

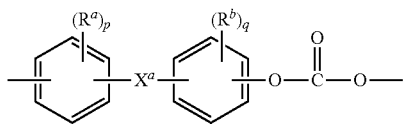

wherein
$R^a$ and $R^b$ are each independently $C_{1-12}$ alkyl, $C_{1-12}$ alkenyl, $C_{3-8}$ cycloalkyl, or $C_{1-12}$ alkoxy,
p and q are each independently integers of 0 to 4, and
$X^a$ is a single bond, —O—, —S—, —S(O)—, —S(O)$_2$—, —C(O)—, or $C_{1-32}$ bridging hydrocarbon group, provided that $X^a$ is not a phthalimidine group; and
a second polycarbonate that is not a phthalimidine copolycarbonate;
wherein the second polycarbonate comprises a polycarbonate homopolymer, a copolycarbonate, or a copolymer comprising carbonate units and ester units;
wherein the film has:
a glass transition temperature of greater than 170° C.;
a dielectric constant at 1 kHz, 23° C. and 50% relative humidity of at least 3.0;
a dissipation factor at 1 kHz, 23° C. and 50% relative humidity of 1% or less; and
a breakdown strength of at least 800 Volt/micrometer.

2. The film of claim 1, wherein the film has one or more of the following properties:
a thickness of more than 0 to less than 10 micrometers; and
a length of at least 10 meters and a width of at least 300 millimeter and at least 80% of the area of the film is a wrinkle-free region, preferably a length of 100 to 10,000 meter, and a width of 300 to 3,000 millimeter.

3. The film of claim 1, wherein the film has at least one of the following properties:
the film has a surface resistivity greater than 0.1 Ohm per square to 100 Ohm per square measured according to ASTMD257;
the dielectric constant change of the film from −40° C. to 140° C. at 1 kHz is less than 10% of the dielectric constant value at 23° C.;
a change of the dissipation factor at 1 kHz from 0° C. to 140° C. is less than 1%; the dissipation factor is less than 1% from 1 kHz to 100 kHz at 23° C. and 50% relative humidity;
the breakdown strength difference of the film from 23° C. to 100° C. is less than 10% from the value measured at 23° C. measured according to ASTM D149; and
the difference in capacitance at 1 kHz is less than +/−5% from 0° C. to 100° C. based on the value at 23° C.

4. The film of claim 1, wherein the phthalimidine carbonate units are units of the formula

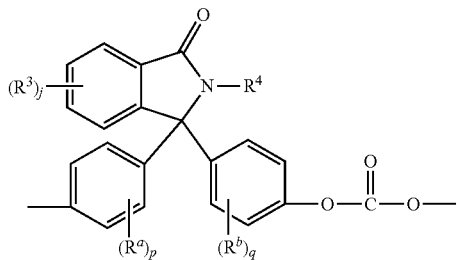

wherein
$R^a$ and $R^b$ are each independently a $C_{1-3}$ alkyl group,
p and q are each independently integers of 0 to 4,
$R^3$ is each independently a $C_{1-6}$ alkyl group,
j is 0 to 4, and
$R^4$ is hydrogen, $C_{1-6}$ alkyl or phenyl optionally substituted with 1 to 5 $C_{1-6}$ alkyl groups.

5. The film of claim 4, wherein the phthalimidine carbonate repeating units are units of the formula

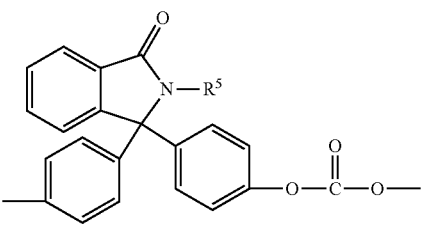

wherein $R^5$ is hydrogen, phenyl or methyl.

6. The film of claim 1, wherein the phthalimidine copolycarbonate is an N-phenylphenolphthaleinylbisphenol, 2,2-bis(4-hydro)-bisphenol A copolycarbonate.

7. The film of claim 1, wherein the film comprises a crosslinked phthalimidine copolycarbonate, and wherein the film exhibits a breakdown strength from 5 to 50% more compared to a film comprising of an uncrosslinked phthalimidine copolycarbonate.

8. The film of claim 1, wherein the film comprises a branched phthalimidine copolycarbonate wherein the film exhibits a breakdown strength from 5 to 50% more compared to a film comprising of an unbranched phthalimidine copolycarbonate.

9. The film of claim 1, wherein the second polycarbonate is a BPA homopolymer.

10. The film of claim 1, wherein the film meets at least one of the following conditions:
the film comprises less than 1,500 ppm total of halogen containing compounds and less than 900 ppm of any halogen containing compounds;
the film comprises less than 0.1 ppm of leachable low ionic chlorides and sulfates;
the film comprises less than 10 ppm each of Al, Ca, Cr, Fe, K, Mg, Na, Ni, Mn, Mo, Zn, and Ti;
the total amount of Al, Ca, Cr, Fe, K, Mg, Na, Ni, Mn, Mo, Zn, and Ti in the film is less than 10 ppm;
the film comprises fewer than two carbonized inclusions having a diameter greater than 20 micrometers in an area of 100 cm$^2$; and
the film comprising less than 1,000 ppm of a compound having a molecular weight of less than 250 Dalton.

11. The film of claim 1, wherein the film further comprises 1 to 50 weight percent of a polymer selected from silicone polyetherimide, polyetherimide sulfone, polyester, polycarbonate other than the phthalimidine copolycarbonate, silicone polycarbonate-polyester copolymer and a combination comprising at least one of the foregoing, based on the total weight of the film.

12. An article comprising the film of claim 1.

13. The article of claim 12, further comprising a layer of a conductive metal or metal alloy deposited on at least a portion of the film, wherein the conductive metal or metal alloy comprises aluminum, zinc, copper, silver, gold, nickel, titanium, chromium, vanadium, platinum, tantalum, niobium, brass, or a combination comprising at least one of the foregoing.

14. The article of claim 13, wherein the conductive metal layer has a thickness of 1 to 3,000 Angstroms or 1 to 2,000 Angstroms.

15. A capacitor comprising a wound article of claim 12 or a portion of a wound article of claim 12.

16. An electronic device comprising the capacitor of claim 15.

17. The electronic device of claim 16, wherein the electric article is an automobile inverter.

18. A method of producing a film of claim 1, comprising extruding a film forming composition comprising the phthalimidine copolycarbonate and the second polycarbonate.

19. The method of claim 18, further comprising irradiating the extruded film at a wavelength and for a time effective to crosslink the polycarbonate, wherein the film comprising the crosslinked polycarbonate exhibits an increase in breakdown strength of 5 to 50% more than the same film comprising an uncrosslinked polycarbonate.

* * * * *